Patented July 20, 1948

2,445,569

UNITED STATES PATENT OFFICE 2,445,569

SULFONATED POLYBENZYL

Arthur Lawrence Fox, Easton, Pa., assignor to E. I. du Pont de Nemours & Company, Wilmington, Del., a corporation of Delaware No Drawing. Application July 17, 1944,
Serial No. 545,391

1 Claim. (Cl. 260—2)

This invention relates to the preparation of polybenzyl and polybenzyl sulfonic acids, and to the utilization of polybenzyl sulfonic acids and their salts.

It is an object of this invention to prepare new dispersing agents for vat dye pastes, pigments, cement, etc. It is a further object of this invention to provide new synthetic tanning agents. It is a still further object to provide new wetting and surface active agents. These and other objects will appear hereinafter.

Polybenzyl may be prepared by a variety of methods. Thus, benzyl chloride or bromide may be polymerized by the employment of a wide variety of catalysts and conditions. As catalysts for the polymerization of benzyl chloride, there may be mentioned such compounds and elements as aluminum chloride, zinc chloride, stannic chloride, ferric chloride, boron trifluoride, zinc powder, copper powder, iron, aluminum mercury amalgam, and magnesium. Solvents such as nitrobenzene, cyclohexane, ethylene dichloride or liquid sulfur dioxide may be used. The molecular weight of the polybenzyl varies greatly depending on its method of production. Polymers have been obtained with a molecular weight as low as 600 or 700 while others have been prepared that had molecular weights of over 3,000.

There appears to be two types of polymer; one soluble in benzene and the other insoluble in benzene. The benzene-soluble portion on sulfonation yielded water-soluble sulfonic acids and their salts, while sulfonation of benzene-insoluble polybenzyl yielded sulfonic acids and salts which are only slightly soluble in water. The polybenzyl sulfonic acids from the benzene-soluble polybenzyl appear to be much more desirable for many purposes than those from the benzene-insoluble material. It is feasible, however, to use a sulfonation product made from a crude polybenzyl composed of benzene-soluble and benzene-insoluble polymers.

The sulfonation of polybenzyl may be carried out in a variety of solvents including nitrobenzene, ethylene dichloride, sulfuryl chloride, and liquid sulfur dioxide. It also is possible to polymerize and sulfonate benzyl chloride in one step, for example, chlorosulfonic acid acts as a polymerizing agent for benzyl chloride and simultaneously sulfonates the polymer. It is also possible to prepare various sulfonic acids of polybenzyl by introducing varying quantities of sulfonic acid groups into the benzene nuclei. It has been found that at least one sulfonic acid group for every four benzyl radicals is necessary in order to obtain water solubility of the sulfonated polybenzyl, but suitable products contain less sulfonic acid group than benzene nuclei per molecule.

The temperature for the polymerization of benzyl chloride may be varied from very low (—40° C.) to moderately high (170° C.). Polymers made at temperatures above 50° C. are not so satisfactory for many purposes as those made below 50° C.

The polybenzyl sulfonic acids and their salts possess utility as synthetic tanning agents (syntans), as dispersing agents for pigments, as dispersing agents for vat dyes, and as dispersing agents for cement. The following examples illustrate, but do not limit the invention. All parts are given by weight.

EXAMPLE I

Six parts of aluminum chloride were dissolved in 500 parts of nitrobenzene by stirring at room temperature, then 253 parts of benzyl chloride were added at once. Within a minute's time a violent reaction occurred, and large volumes of hydrochloric acid gas were evolved. The evolution of hydrochloric acid gas continued over the next hour. At this point 200 parts of water were added, and the nitrobenzene was steam distilled. The insoluble residue from the steam distillation was filtered off and dried. It weighed 191.5 parts.

181 parts of this crude polymer were treated with benzene and the insoluble portion separated and again extracted with benzene. The united benzene extracts were evaporated leaving a residue weighing 152 parts. This is called "B." The insoluble portion weighed 33 parts and is called "C."

Analysis

|  | B | C |
|---|---|---|
| Chlorine | Per cent .18 | Per cent .32 |
| Aluminum | .13 | nil |
| Mol. Weight | 1,625 | 1,763 |

91 parts of "B" were dissolved in 400 parts of ethylene dichloride, and 115 parts of chlorosulfonic acid were added slowly. The reaction mass was warmed to 80° C. on a water bath. After 3 hours of heating on the water bath the ethylene dichloride was steam distilled. This solution of free sulfonic acid showed a pronounced plumping effect on leather when employed as a syntan. When the free sulfonic acid was neutralized, it showed good dispersing properties for Dixie clay in water. It also possessed some value as a detergent.

EXAMPLE II

Six parts of aluminum chloride were dissolved in 500 parts of nitrobenzene by stirring at room temperature. The reaction mass was cooled to below 10° C. and 253 parts of benzyl chloride were added slowly over 2 hours. After all the benzyl chloride had been added, it was stirred for 2 hours at 10° C. then gradually allowed to come up to room temperature. The nitrobenzene was steam distilled off. The separated residue weighed 190 parts and was much lighter in color than the polybenzyl made as described in Example I.

*Analysis*

Chlorine _____ percent __ 1.09
Molecular weight _____ 1149

Without separating a benzene-soluble and benzene-insoluble fraction, 91 parts were sulfonated by dissolving in 200 parts of ethylene dichloride and adding 115 parts of chlorosulfonic acid slowly. The mixture was warmed to 80° C. on a water bath for 1 hour, and then the ethylene dichloride was steam distilled. The aqueous residual solution weighed 1568 parts. This solution of polybenzyl sulfonic acid gave a firm, yellow, plump piece of leather when applied as a syntan to chrome tanned leather. When dried, this piece of leather showed less loss in color value than leather treated with a syntan of the type represented by the formaldehyde condensation product of naphthalene sulfonic acid. The sodium salt of this product was very effective as a dispersing agent for Dixie clay in water.

EXAMPLE III

A polymerization of benzyl chloride was carried out as in Example II but after the polymerization was complete, the temperature was not allowed to rise, and 150 parts of chlorosulfonic acid were added to the nitrobenzene suspension at 0–10° C. This reaction mass was stirred for 12 hours, and then steam distilled. The residue was treated with fuller's earth and filtered. The sodium salt of this material was very effective as a dispersing agent for Dixie clay in water, and the free sulfonic acid was useful as a synthetic tanning agent and as a dye dispersing agent in leather.

EXAMPLE IV 800 parts of sulfur dioxide and 5 parts of aluminum chloride were stirred at −15 to −20° C. for ten minutes. Then 200 parts of benzyl chloride were gradually added over a period of ten minutes. After addition was complete, the charge was stirred for 40 minutes at −15 to −20° C., and then 116 parts of chlorosulfonic acid were gradually added. This reaction mass was kept at −15° C. for 16 hours, then warmed up to room temperature, 720 parts of water were added, and the charge stirred for 45 minutes. The reaction mass was allowed to stand and then decanted from a small amount of unsulfonated material. The filtrate weighed 887 parts. This was warmed to remove any sulfur dioxide and volatile material. The sodium salt of this sulfonated polybenzyl was excellent as a dispersing agent for Dixie clay in water. It had moderate wetting properties and its detergency in soft water was appreciable. In hard water it was less effective.

EXAMPLE V 25 parts of benzyl chloride were dissolved in 100 parts of sulfuryl chloride and into this was slowly added 24 parts of chlorosulfonic acid. A vigorous reaction resulted with large volumes of gas being evolved. A thick, black paste insoluble in the sulfuryl chloride formed. The liquid was decanted and the paste taken up in 400 parts of water. The sodium salt of this material was a very effective dispersing agent for Dixie clay and the free sulfonic acid was an effective syntan, although it colored the leather slightly. In accordance with this example polymerization and sulfonation occur simultaneously in the sulfuryl chloride.

EXAMPLE VI

In a cast-iron pot were placed 200 parts of benzyl chloride. This was heated to 90° C. and gas was evolved quite rapidly. The addition of 800 more parts of benzyl chloride was then begun and the temperature remained at 90–100° C. during this entire addition. After all the benzyl chloride had been added, the reaction mass became quite viscous. The total time of polymerization was 4 hours, and the yield was 670 parts of a greenish solid having a molecular weight of 1700.

180 parts of this polybenzyl were dissolved in 2000 parts of ethylene dichloride. To the solution were added at 0–10° C., 233 parts of chlorosulfonic acid. The sulfonated material separated as a plastic solid which prevented agitation. It was held at 0–10° C. for 16 hours without agitation. Then water was added, and the reaction product steam distilled leaving a greenish fluorescent light colored solution. A portion of this was neutralized.

*Analysis*

| | Per cent |
|---|---|
| Total solids | 4.72 |
| Sodium chloride | .84 |
| Sodium sulfate | .73 |
| Active ingredient | 3.15 |

This material (e. g., the free sulfonic acid) had twice the tanning effect of the formaldehyde condensation product of naphthalene sulfonic acid.

The sulfonation of the above polymer may also be carried out in liquid sulfur dioxide.

EXAMPLE VII 253 parts of benzyl chloride were polymerized in cyclohexane employing aluminum chloride as a catalyst. The conditions of polymerization were similar to those of Example II. 40.7% of the polymer was not soluble in benzene, and the molecular weight of the soluble portion was 1008.

91 parts of the crude polymer were sulfonated in 200 parts of ethylene dichloride employing 115 parts of chlorosulfonic acid at 10–20° C. After the ethylene dichloride had been steam distilled, the residue weighed 235 parts and was filtered from unsulfonated sludge. The filtrate when tested as a syntan gave a plumper, slightly firmer and yellower leather than does the formaldehyde condensation product of naphthalene sulfonic acid. It had equivalent dye dispersing properties.

EXAMPLE VIII 126 parts of benzyl chloride and 116 parts of chlorosulfonic acid were alternately added in small portions to a Werner and Pfleiderer mixer always maintaining the benzyl chloride slightly in excess of the chlorosulfonic acid. Polymerization occurred vigorously and large volumes of hydrochloric acid gas were evolved. The addition of the reactants was completed in 7 minutes. After the addition was complete, there was a tendency to freeze the mill and 22 parts of sulfuric acid monohydrate were added to prevent this solidification. The total mixing time was 45 minutes. The temperature during the run rose to 60–80° C., although cooling water was running through the jacket. The reaction mass was completely soluble in water. Its sodium salt was a satisfactory dispersing agent for Dixie clay in water and the free sulfonic acid gave a good quality leather when employed as a syntan.

The following examples illustrate uses of sulfonated polybenzyls.

(a) 100 parts of Ponsol Jade Green press cake (Color Index No. 1101) were treated with 1 part of 30% polybenzyl sodium sulfonate which caused the thick press cake to become very thin and stirrable.

(b) 20 parts of Ponsol Blue GD (Color Index No. 1113) and 40 parts of dextrin were mixed with 40 parts of polybenzyl sodium sulfonate, and enough water to make a stirrable mass was added. This mixture after being drum dried dispersed readily when thrown on water.

(c) 20 parts of Ponsol Golden Orange 2RT (Color Index No. 1097), 3.5 parts of sugar and 67.5 parts of dextrin were mixed with 10 parts of polybenzyl sodium sulfonate and sufficient water to make a stirrable mass. This material on drum drying gave grains which dispersed readily in water.

(d) Two suspensions of Dixie clay were made up by adding 120 parts of Dixie clay to 330 parts of water containing respectively 0.3 and 1.2 parts of polybenzyl sodium sulfonate. The viscosity of these suspensions was measured by observing the time necessary for 100 revolutions of the paddle in a Stormer viscosimeter under the propulsion of a 200 gram weight. Employing ¼% polybenzyl sodium sulfonate on the weight of Dixie clay, the spinning time for 100 revolutions was 7–7.5 seconds, whereas employing 1% of the polybenzyl sodium sulfonate the spinning time was about 6.8 seconds. These times compare with 15 seconds when no polybenzyl sodium sulfonate is used and 5 seconds when no Dixie clay is in the water.

(e) 200 parts of chrome tanned calfskin (in the blue) and 500 parts of water containing 6 parts of polybenzyl sulfonic acid were shaken for 30 minutes at 75° C., and then 2 parts of sulfonated neat's-foot oil were added and it was drummed for 20 minutes at 125° F. The leather was then rinsed and dried. This gave a firm, plump, white leather.

(f) 200 parts of chrome tanned calfskin (in the blue) were added to a mixture of 500 parts of water and 2 parts of an acid or direct dye or a mixture thereof, and 2 parts of polybenzyl sulfonic acid added. This mixture was shaken for 30 minutes at 75° F., then rinsed, and to the leather was added a solution of 1 part of basic dye in 500 parts of water. This was shaken for 30 minutes at 100° F.; then the leather was rinsed, and 2 parts of sulfonated neat's-foot oil in 500 parts of water were added, and it was shaken for 30 minutes. The leather was then rinsed and dried. The quality of dyeing was fully equal in strength, shade, brightness and levelness with that obtained employing other commercial syntans as the tanning agent.

The method of producing the polybenzyl may be varied widely. In addition to the catalysts disclosed in the examples, a large number of other catalysts may be employed. Stannic chloride is of utility as a catalyst because it tends to yield the benzene-soluble type of polymer which sulfonates easily to give a water-soluble material. The conditions of temperature disclosed in the examples may also be varied as well as the time. Any solvent which does not react with aluminum chloride is satisfactory for the preparation of the polymer.

In the examples the sulfonation has been carried out by chlorosulfonic acid. It is also possible to use other sulfonating agents, such as sulfuric acid monohydrate, oleum, or sulfur trioxide in liquid sulfur dioxide. Cathalysts may also be used in the sulfonating step, for example, the sulfonation may be carried out in the presence of boron trifluoride.

If it is desired to obtain a pure polybenzyl sodium sulfonate or polybenzyl sulfonic acid, free from admixed acids or salts, it is possible to prepare these by dialysis as the high molecular weight sulfonic acid or its salt does not pass through a "Cellophane" membrane.

Resort may be had to such modifications and variations as fall within the spirit of the invention and the scope of the appended claim.

I claim:

A process for preparing a sulfonated polybenzyl compound containing one sulfonic acid group for every four benzyl radicals which comprises reacting with chlorosulfonic acid, at a temperature between 0° C. and 10° C. a reaction mass obtained by adding benzyl chloride to a suspension of aluminum chloride in an organic solvent at a temperature below 10° C.

ARTHUR LAWRENCE FOX.

REFERENCES CITED

The following references are of record in the file of this patent:

UNITED STATES PATENTS

| Number | Name | Date |
|---|---|---|
| 1,825,802 | Kranzlein | Oct. 6, 1931 |

FOREIGN PATENTS

| Number | Country | Date |
|---|---|---|
| 490,764 | Great Britain | Aug. 22, 1938 |

OTHER REFERENCES

Stephen et al.: Beilstein, vol. 5, second supplement, page 228.

Lauter: Chem. Abst., vol. 29, page 6215 (1935).

Ellis: Chemistry of Synthetic Resins (1935). Reinhold Pub. Co., vol. I, p. 55; vol. II, pp. 1129–1131.